July 9, 1957  C. O. WOOD  2,798,589
SUPPORTS FOR ENDLESS CONVEYORS
Filed Nov. 23, 1955
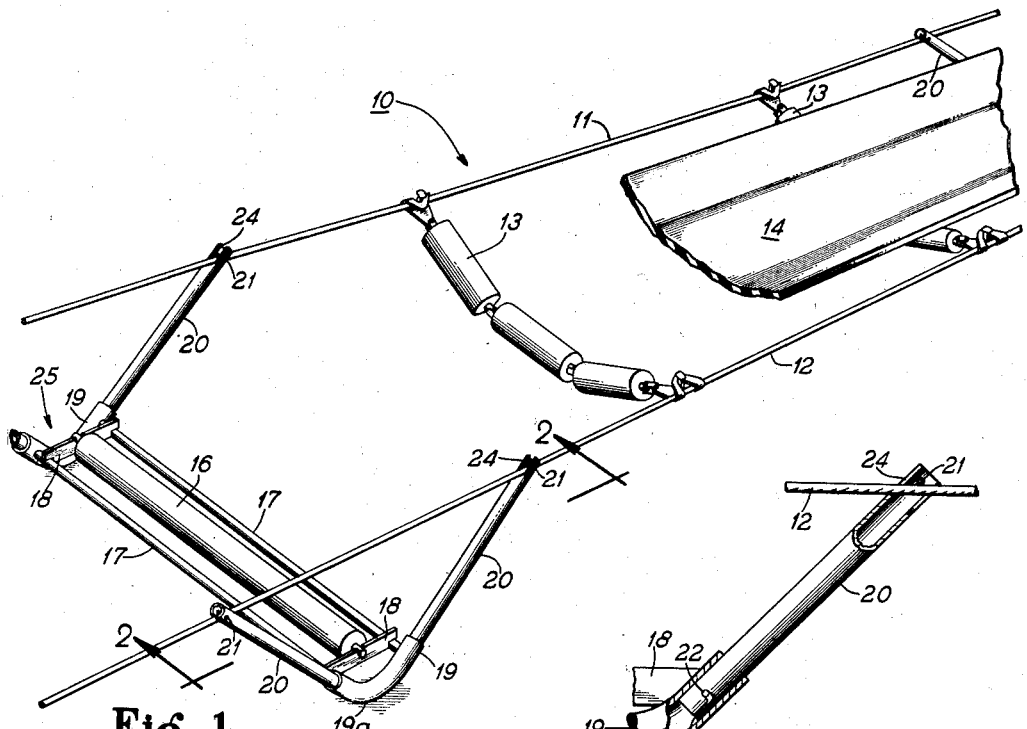
Fig. 1
Fig. 3
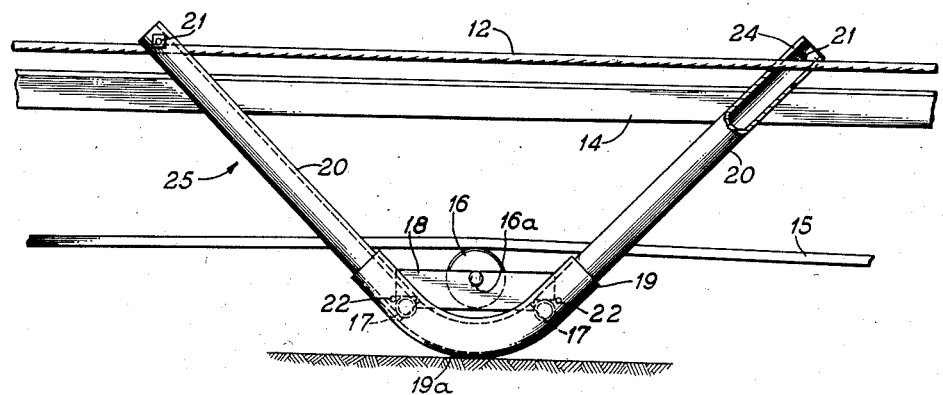
Fig. 2
INVENTOR.
Claude O. Wood
BY
Murray A. Gleeson
ATTORNEY

United States Patent Office 2,798,589
Patented July 9, 1957

2,798,589

SUPPORTS FOR ENDLESS CONVEYORS

Claude O. Wood, Chicago, Ill., assignor to Goodman Manufacturing Company, Chicago, Ill., a corporation of Illinois Application November 23, 1955, Serial No. 548,566

5 Claims. (Cl. 198—109)

This invention relates generally to a belt conveyor of the type which is supported upon spaced flexible strands, and more particularly to improvements in supports for such flexible strands.

In belt conveyors of the type which are supported upon spaced flexible strands it is customary to support the strands with a plurality of standards interposed between the conveyor ends. A non-uniformly loaded belt traveling upon a conveyor of the flexible strand type creates some problems at the points where the strands are supported. It is well known that a uniformly loaded belt exhibits a sag between supports which is proportional to the distance therebetween, and that flexible strands supporting said belt are likewise loaded and exhibit a like property of having a sag which is proportional to the distance between supports. It is also well known that where the interposed supports are spaced approximately evenly apart and where the strand is uniformly loaded that the sag between two such supports is approximately equal to the sag between other pairs of supports so spaced and that where such pairs occur concurrently there is less tendency for the supports to tip over or shift longitudinally in the direction of the strand. Where the belt and the flexible strands are non-uniformly loaded, as in the case where a previously unloaded belt is being loaded, or where a loaded belt is being unloaded, the sag between supports is not uniform, the sag under the load being greater than previously and the sag corresponding to the unloaded reach of belt being less than previously. In the aforementioned case, the flexible strand exhibits a tendency to shift longitudinally along its own axis in a direction toward the load and urges the interposed supports in a like direction causing said supports to shift or to tip over depending upon the condition of the base of the support.

With the foregoing considerations in mind, it is a principal object of my invention to provide an improved support for the spaced flexible strands of a rope frame conveyor, and to enable such support to shift bodily of itself, or to cant within limits.

Another object is to provide a portable support of the nature described which can be easily inserted into a conveyor of the rope frame type.

Other objects and important features of my invention will be apparent from a study of the specification following, taken with the drawings which illustrate and describe a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope of the subjoined claims.

In the drawings:

Fig. 1 is a perspective view of a portion of a belt conveyor of the type which is supported upon spaced flexible strands, said conveyor having the improvements according to the present invention embodied therein;

Fig. 2 is a detailed elevation view to an enlarged scale of a portion of the conveyor viewed along line 2—2 of Fig. 1, showing details of a support standard constructed in accordance with the present invention; and Fig. 3 is a fragmentary view similar to Fig. 2 but showing details of assembling the support standard seen in Fig. 2.

Referring now particularly to Fig. 1 of the drawings, there is shown a belt conveyor indicated generally by the reference numeral 10. Such a belt conveyor is supported upon spaced flexible strands 11 and 12, which in turn are supported at intervals throughout their length upon spaced support standards 25.

Troughing roller assemblies indicated by the reference numeral 13 are supported by the spaced strands 11 and 12 at points intermediate the support standards 25. The troughing roller assemblies 13 are for the purpose of supporting and guiding the conveying reach 14 of an endless conveyor belt, the return reach 15 of such belt being supported and guided by return idler rollers 16 which are mounted upon the supports 25.

The precise form of the troughing roller assemblies 13 forms no part of my present invention, and any suitable form thereof may be employed to give the proper troughing contour to the conveying reach 14. Such troughing roller assemblies 13 are suspended from the support strands 11 and 12 and the load on the belt 14 transmitted into the troughing roller assemblies 13 imposes a lateral pull on the support strands 11 and 12 to pull them inward as seen in Fig. 1.

Referring now particularly to Fig. 2 of the drawings, the supports 25 for the spaced flexible strands consist of paired legs 20, each pair of legs extending upward in diverging directions from a subframe consisting of a curved tubular ground engaging member 19 connected to an opposite tubular member 19 by a pair of laterally extending spreaders 17. Brackets 18 are supported on the spreaders 17 and are slotted as at 16a in their upper edges to receive an idler roller 16 for the return reach of the belt 15. The curved tubular member 19 thus provides a curved foot 19a adapted readily to rest on a mine floor or the like.

The upper ends of each of the diverging legs 20 are arranged with slots 24 to receive the strands 11 or 12, to provide a saddle therefor, and movement of the strands out of such slots is prevented by a bolt 21 spanning the slot 24 and supported in the limb portions shown at the slot 24.

Each pair of diverging legs 20 is anchored at its lower end into the tubular member 19 by means of a bayonet slot 23 in the lower end of the leg 20, the slot 23 cooperating with a locking pin 22 retained in the tubular member 19.

The slot 24 in the upper end of leg 20 cooperates with the strand 11 or 12 in such a fashion as to prevent release of the bayonet connection just described.

Consider now the situation in which support 24 has been inserted into a rope frame conveyor and in which a concentrated load on belt 14 is approaching the support 25. It can be seen that the load on the belt 14 acting through idler assembly 13 and flexible strands 11 and 12 comes to bear downwardly on legs 20 of support 25 on the side nearest the approaching load. The support 25 is so constructed that a downward force against one of a pair of legs 20 on one side tends to give a rocking or rocking and sliding motion about the foot 19a of curved member 19 such that the other leg of the pair tends to move upwardly. Such upward motion is resisted by the weight of the adjoining portion of rope frame conveyor, and such motion is further resisted by the tension existing in the flexible strands 11 and 12, such that the degree of rocking of support 25 is effectively regulated by conditions which already exist within the system.

Another important feature of support 25 is that as the load approaches more closely and begins to bear upon the upraised leg 20, a restoring motion is set into action such that when the load has passed the support 25 the forces are again balanced and the support 25 is restored to its normally upright position.

Thus it will be seen that, from the broadest standpoint, the crux of the present invention is the supplying of leg means (19, 20, 20) for each of the flexible strands 11 bearing against the strand in at least two places 21, 21, and means, in this case the two cross pieces or spreaders 17, for maintaining the leg means in upright, working position.

While the invention has been described in terms of a preferred embodiment thereof its scope is intended to be limited only by the claims here appended.

I claim as my invention:

1. In an endless belt conveyor having a conveying reach, a pair of spaced flexible strands, flexible troughing idler assemblies spanning the distance between said strands for transferring the load on said conveying reach into said strands, means supporting said strands at intervals throughout their length, each of said means comprising a support including spaced pairs of leg members, means joining each pair of leg members at the lower ends thereof and providing a ground engaging member, the leg members of each pair extending in diverging directions from said ground engaging member and upward toward a flexible strand, means maintaining said pairs of leg members in a spaced relationship corresponding to the spacing of said flexible strands, said last named means including means for guiding the return reach of said endless belt, and means for anchoring said leg members to said flexible strands at points remote from their lower ends whereby the changing strains on said flexible strands incident to the changing loads on said conveying reach will cause said supporting means to rock in limited amounts only and to shift in directions longitudinally of said conveyor without tipping.

2. In an endless belt conveyor having a conveying reach, a pair of spaced flexible strands, flexible troughing idler assemblies spanning the distance between said strands for transferring the load on said conveying reach into said strands, means supporting said strands at intervals throughout their length, each of said means comprising a support including spaced pairs of leg members, means joining each pair of leg members at the lower ends thereof and providing a ground engaging member, the leg members of each pair extending in diverging directions from said ground engaging member and upward toward a flexible strand, means maintaining said pairs of leg members in a spaced relationship corresponding to the spacing of said flexible strands, and means for anchoring said leg members to said flexible strands at points remote from their lower ends whereby the changing strains on said flexible strands incident to the changing loads on said conveying reach will cause said supporting means to rock in limited amounts only and to shift in directions longitudinally of said conveyor without tipping.

3. In an endless belt conveyor having a conveying reach, a pair of spaced flexible strands, flexible troughing idler assemblies spanning the distance between said strands for transferring the load on said conveying reach into said strands, means supporting said strands at intervals throughout their length, each of said means comprising a support including spaced pairs of leg members, means joining each pair of leg members at the lower ends thereof and providing a ground engaging member, the leg members of each pair extending in diverging directions from said ground engaging member and upward toward a flexible strand, said last named means including means for guiding the return reach of said endless belt, and means for anchoring said leg members to said flexible strands at points remote from their lower ends whereby the changing strains on said flexible strands incident to the changing loads on said conveying reach will cause said supporting means to rock in limited amounts only and to shift in directions longitudinally of said conveyor without tipping.

4. In an endless belt conveyor having a conveying reach, a pair of spaced flexible strands, flexible troughing idler assemblies spanning the distance between said strands for transferring the load on said conveying reach into said strands, means supporting said strands at intervals throughout their length, each of said means comprising a support including spaced pairs of leg members, means joining each pair of leg members at the lower ends thereof and providing a ground engaging member, the leg members of each pair extending in diverging directions from said ground engaging member and upward toward a flexible strand, and means for anchoring said leg members to said flexible strands at points remote from their lower ends whereby the changing strains on said flexible strands incident to the changing loads on said conveying reach will cause said supporting means to rock in limited amounts only and to shift in directions longitudinally of said conveyor without tipping.

5. In an endless belt conveyor having a conveying reach, a pair of spaced flexible strands, flexible troughing idler assemblies spanning the distance between said strands for transferring the load on said conveying reach into said strands, means supporting said strands at intervals throughout their length, each of said means comprising a support including spaced pairs of leg members, a ground engaging member for each pair of legs, disconnectable coupling means between each leg member and its corresponding ground engaging member, the leg members of each pair extending in diverging directions from said ground engaging member and upward toward a flexible strand, and means for anchoring said leg members to said flexible strands at points remote from their lower ends whereby the changing strains on said flexible strands incident to the changing loads on said conveying reach will cause said supporting means to rock in limited amounts only and to shift in directions longitudinally of said conveyor without tipping.

References Cited in the file of this patent

UNITED STATES PATENTS 1,748,301   McKinlay _____ Feb. 25, 1930